(12) United States Patent
Higgins (10) Patent No.: US 8,079,182 B1
(45) Date of Patent: Dec. 20, 2011

(54) INFLATABLE GRAIN STORAGE APPARATUS

(76) Inventor: Darcy Higgins, Carrot River (CA)

( * ) Notice: Subject to any disclaimer, the term of this patent is extended or adjusted under 35 U.S.C. 154(b) by 0 days.

(21) Appl. No.: 13/027,513

(22) Filed: Feb. 15, 2011

(51) Int. Cl.
*E04B 1/34* (2006.01)
*E04G 11/04* (2006.01)
*E04H 15/20* (2006.01)

(52) U.S. Cl. ............ 52/2.11; 52/2.17; 52/2.18; 52/2.25

(58) Field of Classification Search .................. 52/2.17, 52/2.18, 2.19, 2.11, 2.13, 2.21, 2.22, 2.23, 52/2.25, 86, DIG. 14; 135/87, 900
See application file for complete search history.

(56) References Cited

U.S. PATENT DOCUMENTS

| | | | | |
|---|---|---|---|---|
| 2,955,606 A * | 10/1960 | Walker | ............................ | 52/2.21 |
| 3,116,746 A * | 1/1964 | Bird | ................................ | 52/2.23 |
| 3,480,023 A * | 11/1969 | McConnell et al. | ........... | 135/125 |
| 4,036,244 A * | 7/1977 | Huddle | ............................. | 52/63 |
| 4,317,315 A | 3/1982 | LeBlang | | |
| 4,332,112 A * | 6/1982 | Hsu | ................................ | 52/2.21 |
| 4,567,696 A * | 2/1986 | Malet | ............................. | 52/2.25 |
| 5,007,212 A * | 4/1991 | Fritts et al. | ..................... | 52/2.18 |
| 5,247,768 A * | 9/1993 | Russo | ............................ | 52/2.13 |
| 5,566,512 A * | 10/1996 | Page | ............................. | 52/2.16 |
| 5,570,544 A | 11/1996 | Hale et al. | | |
| 5,669,182 A * | 9/1997 | Griffis | ............................. | 52/2.18 |
| 5,860,251 A * | 1/1999 | Gleich | ............................ | 52/2.25 |
| 5,893,238 A | 4/1999 | Peacock et al. | | |
| 6,119,408 A * | 9/2000 | Page | ............................... | 52/2.23 |
| 6,192,633 B1 | 2/2001 | Hilbert | | |
| 6,260,306 B1 * | 7/2001 | Swetish et al. | ................ | 52/2.18 |
| 6,438,900 B1 * | 8/2002 | Page | ............................... | 52/2.23 |
| 6,606,826 B2 | 8/2003 | Nagle | | |
| 6,623,322 B1 * | 9/2003 | Lesniak | ........................... | 441/38 |
| 6,722,084 B2 * | 4/2004 | Berman | .......................... | 52/2.11 |
| 7,128,207 B2 * | 10/2006 | Anderson et al. | ............. | 206/223 |
| 7,481,234 B1 * | 1/2009 | Gustafson et al. | .............. | 135/91 |
| 7,552,555 B2 * | 6/2009 | Pellecuer et al. | ............... | 40/610 |
| 7,866,101 B2 * | 1/2011 | Boggs, Jr. | ......................... | 52/202 |

* cited by examiner

*Primary Examiner* — Mark Wendell
(74) *Attorney, Agent, or Firm* — Crossley Patent Law; Mark A. Crossley (57) ABSTRACT

The inflatable grain storage apparatus provides a truly portable inflatable and collapsible structure. The apparatus structure is fully integral. The apparatus is importantly bi-inflatable, whereby the reversible air pump air delivery and removal is via a Y with valve that provides for filling and emptying the spine and straight supports and also the structure interior separately or cumulatively. This hastens filling and ensures proper filling of the spine and straight supports without potential kinking or delays. The floor is importantly reinforced with bi-directional straps and is comprised of heavier material than are the above moisture and material proof components.

12 Claims, 7 Drawing Sheets

INFLATABLE GRAIN STORAGE APPARATUS

BACKGROUND OF THE INVENTION

Portable storage structures have proven useful in recent years. Inflatable, portable storage structures are an example of such, as these structures offer true portability versus the assembly and disassembly of other structures that are actually and truly only semi-portable. The storage of grain is but one example of the need for easily portable storage structures. In many instances grain farmers deposit grain in heaps on the ground, a practice that results in loss and in spoilage. Past solutions to this problem centered on permanent vessels such as silos. As silos are not portable, grain must be transported to reach same. And, silos are expensive to locate and to build. Silos thereby offer an example of the need for portable storage, especially portable grain storage. While grain silo bags have provided somewhat of a solution to some farmers, the equipment and practice is expensive and labor intensive. The present apparatus provides a unique, easily operated, self-supporting, and inexpensive solution to portable storage.

FIELD OF THE INVENTION

The inflatable grain storage apparatus relates to inflatable structures and more especially to a self-supported and inclusive inflatable structure that is particularly effective for grain storage.

SUMMARY OF THE INVENTION

The general purpose of the inflatable grain storage apparatus, described subsequently in greater detail, is to provide an inflatable grain storage apparatus which has many novel features that result in an improved inflatable grain storage apparatus which is not anticipated, rendered obvious, suggested, or even implied by prior art, either alone or in combination thereof.

To attain this, the inflatable grain storage apparatus provides a truly portable inflatable and collapsible structure. Importantly, the apparatus is fully integral, with the exception of the air pump and hoses that may be removable. The apparatus is importantly bi-inflatable, whereby the air pump delivery is via a Y with valve that provides for filling the spine and straight supports and also the structure interior separately or cumulatively. This hastens filling and ensures proper filling of the spine and straight supports without potential kinking or delays. The shape of the structure has importantly been experimentally determined to be ideal. This importance includes the right circular half cones forming opposite end of the apparatus and the straight slanted sides. The straight supports are importantly preferred over any form or curved supports. The materials used in the exterior and the floor are impregnable to liquids and solids. The floor is importantly reinforced with bi-directional straps and is comprised of heavier material than are the above components. The floor may thereby be completely flattened prior to apparatus inflation and ensure against folds and failures associated with some inflatable structures. The floor also does not experience lateral elasticity. The materials of the apparatus are of sufficient integrity to prevent animal and pest invasion as well as weather element invasion. In the floor, each strap may be anchored to a surface via the d-rings. Fewer d-rings than straps may be provided, and more d-rings than straps may be provided. Importantly, each strap may end outwardly in a d-ring for even greater floor support. A seam may be disposed between each side and each right circular half cone.

As a space saving feature as well as preservative feature for contents, the apparatus structure may importantly be allowed to conform to the shape of contents with Y manifold with Y setting or with pump cessation. Conformation to contents can reduce oxygen content within the interior and thereby increase the life span and decrease degradation of contents therein. Additionally, the pump may be a reversible pump that can evacuate air from the apparatus interior to further enhance the above features.

The first end and, optionally the second end of the apparatus structure provide access to the interior. Such access may be provided by various closures, with the preferred closures being the illustrated vertical closure connected to the arced closure, features ideal for filling and emptying the structure.

Thus has been broadly outlined the more important features of the improved inflatable grain storage apparatus so that the detailed description thereof that follows may be better understood and in order that the present contribution to the art may be better appreciated.

An object of the inflatable grain storage apparatus is to be highly portable.

Another object of the inflatable grain storage apparatus is to be especially useful for grain storage.

A further object of the inflatable grain storage apparatus is to be quickly inflatable.

An added object of the inflatable grain storage apparatus is to be quickly inflatable via bi-inflatable design whereby supporting spine and straight supports and the structure may be separately or cumulatively inflated and deflated.

And, an object of the inflatable grain storage apparatus is to be impervious to invasion by animals and elements.

Still another object of the inflatable grain storage apparatus is to provide substantial structural integrity with relation to inflatable structures.

Yet another object of the inflatable grain storage apparatus is to provide a fully integral structure.

Another object of the inflatable grain storage apparatus is to selectively conform to content shape.

These together with additional objects, features and advantages of the improved inflatable grain storage apparatus will be readily apparent to those of ordinary skill in the art upon reading the following detailed description of presently preferred, but nonetheless illustrative, embodiments of the improved inflatable grain storage apparatus when taken in conjunction with the accompanying drawings.

DETAILED DESCRIPTION OF THE DRAWINGS

With reference now to the drawings, and in particular FIGS. 1 through 6 thereof, the principles and concepts of the inflatable grain storage apparatus generally designated by the reference number 10 will be described.

Figure 1:
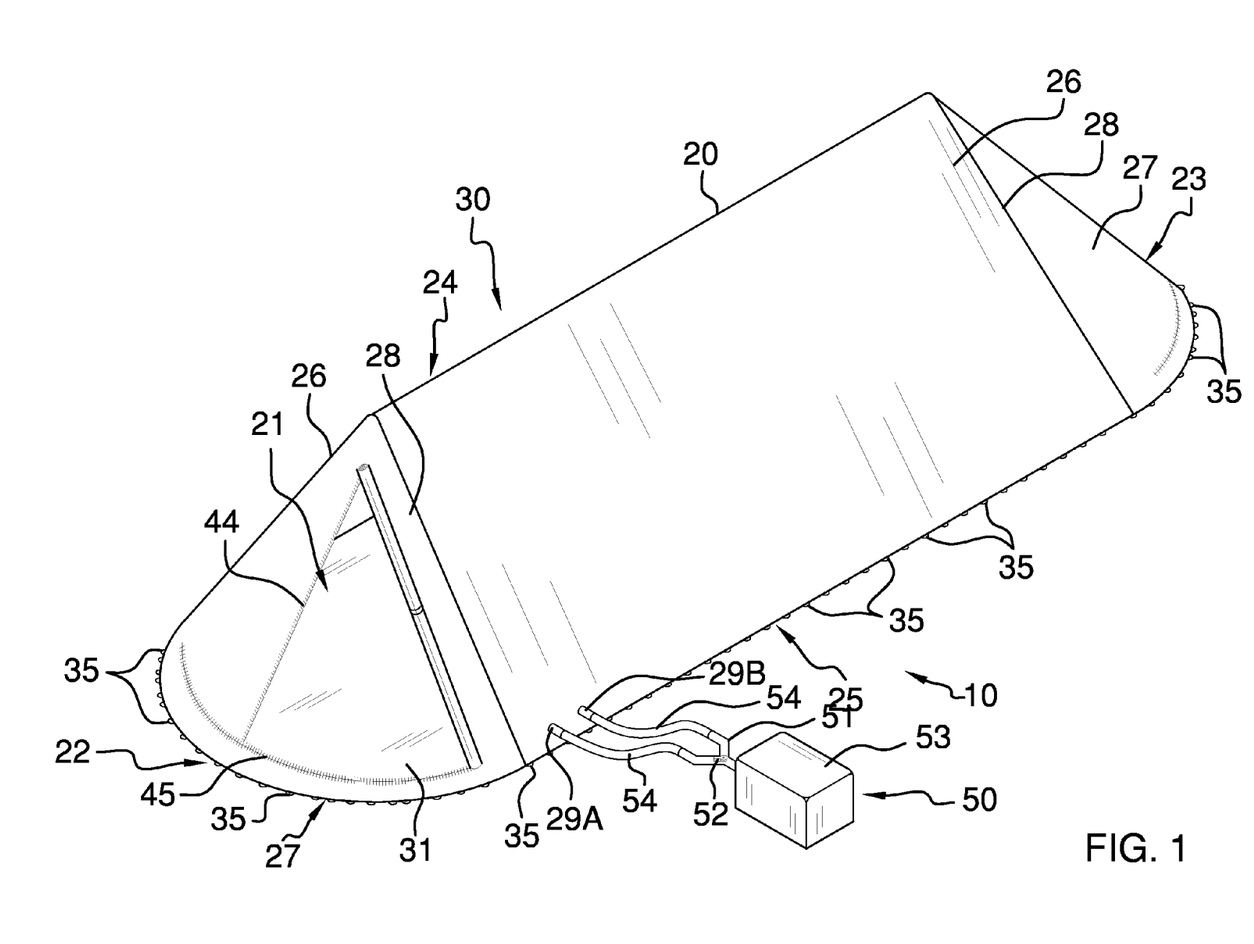
FIG. 1 is a top perspective view.

Referring to FIG. 1, the apparatus 10 partially comprises the selectively inflated structure 30 having an exterior 20 and an interior 21, a first end 22 spaced apart from a second end 23, and a top 24 spaced apart from a bottom 25. The floor 31 is disposed at the bottom 25.

Figure 5:
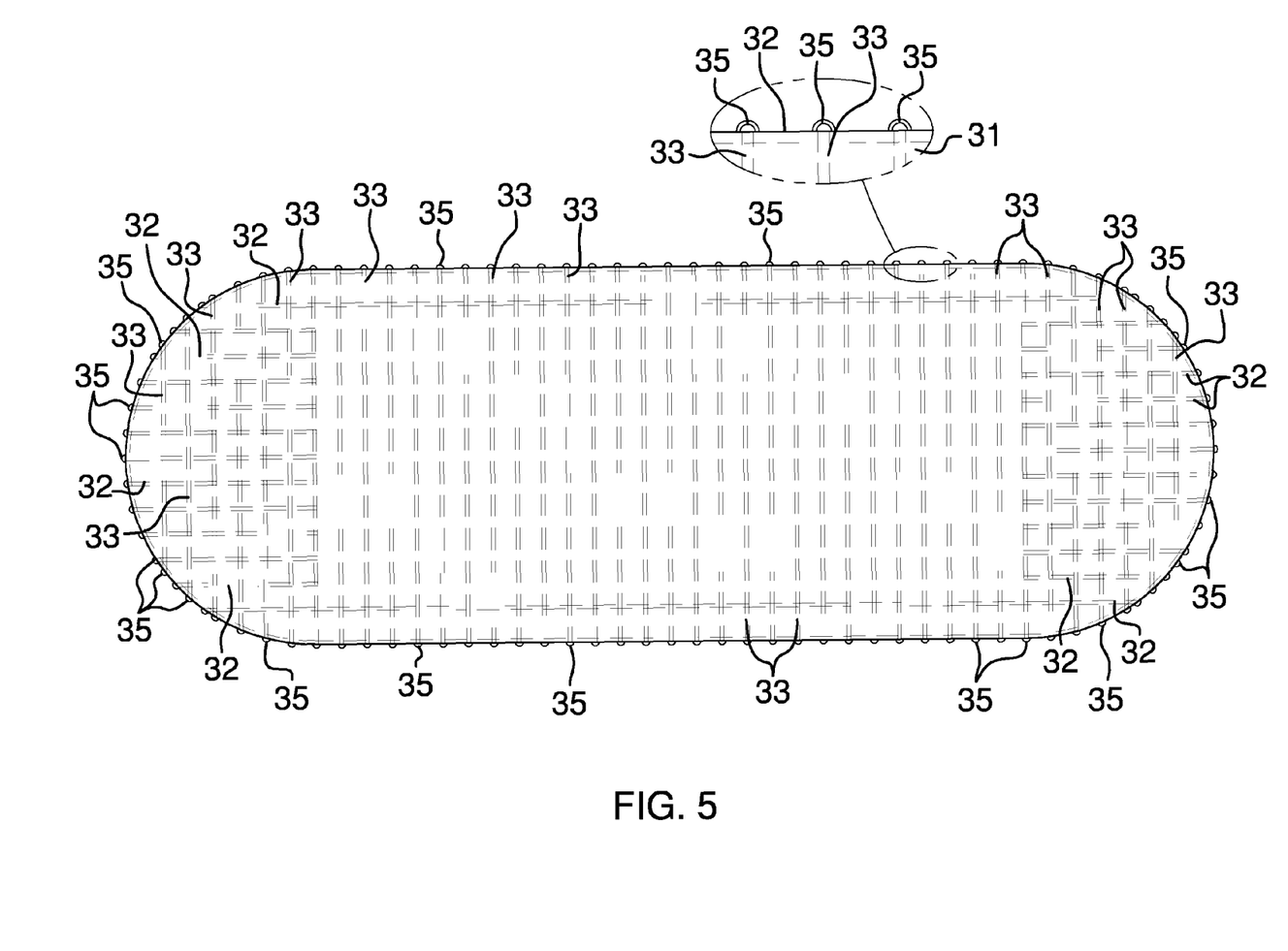
FIG. 5 is a bottom plan view of the floor.
Figure 6:
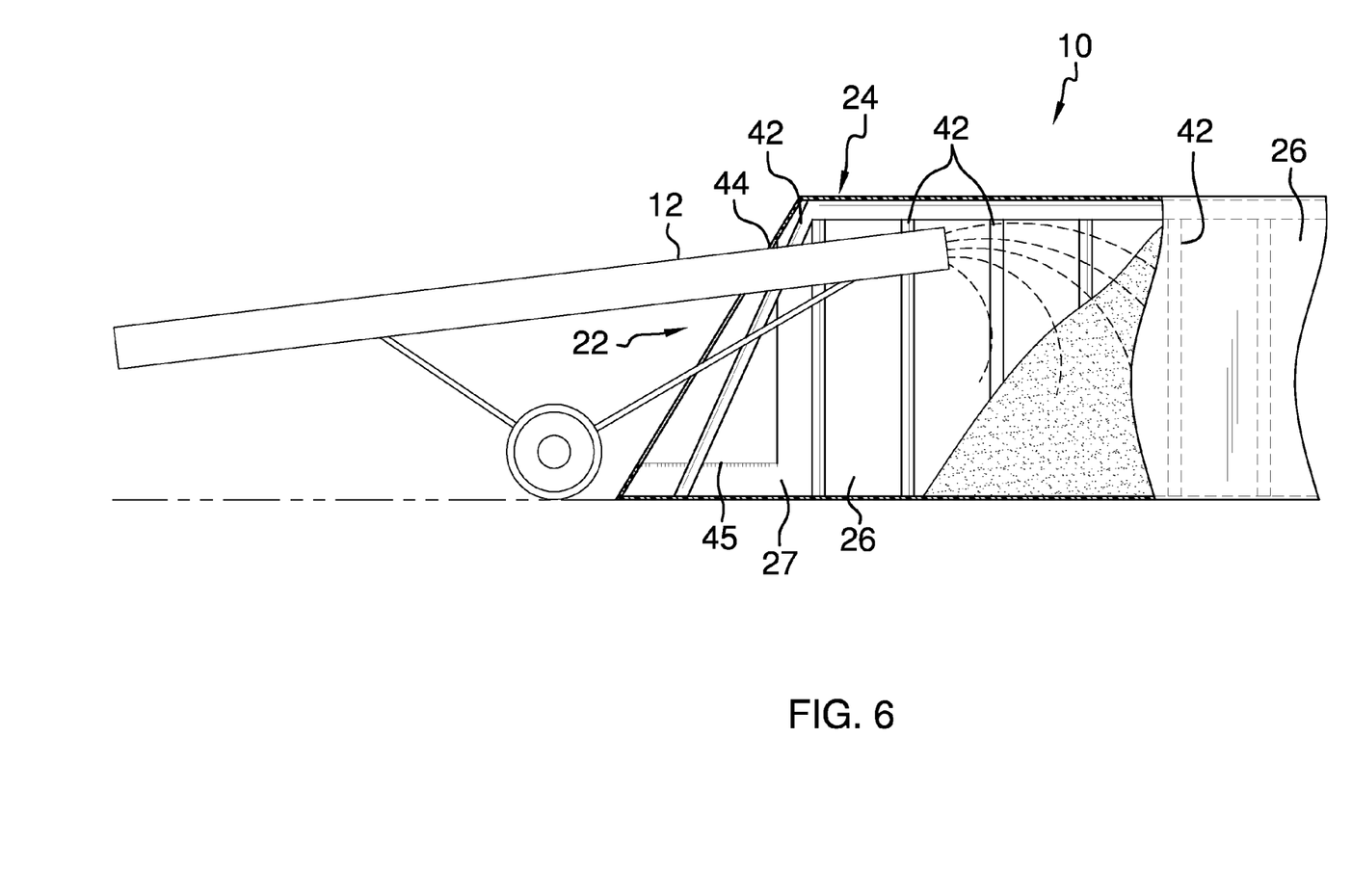
FIG. 6 is a partial cross sectional view, in use.

Referring to FIG. 5, the plurality of spaced apart longitudinal straps 32 are disposed in the floor 31. The plurality of spaced apart cross straps 33 are disposed in the floor 31. The cross straps 33 are at a perpendicular to the longitudinal straps 32. The plurality of spaced apart d-rings 35 are disposed outwardly from floor 31. One of each of the plurality of spaced apart d-rings 35 is extended from each strap. The floor 31 further comprises d-rings 35 between the straps.

Figure 2:
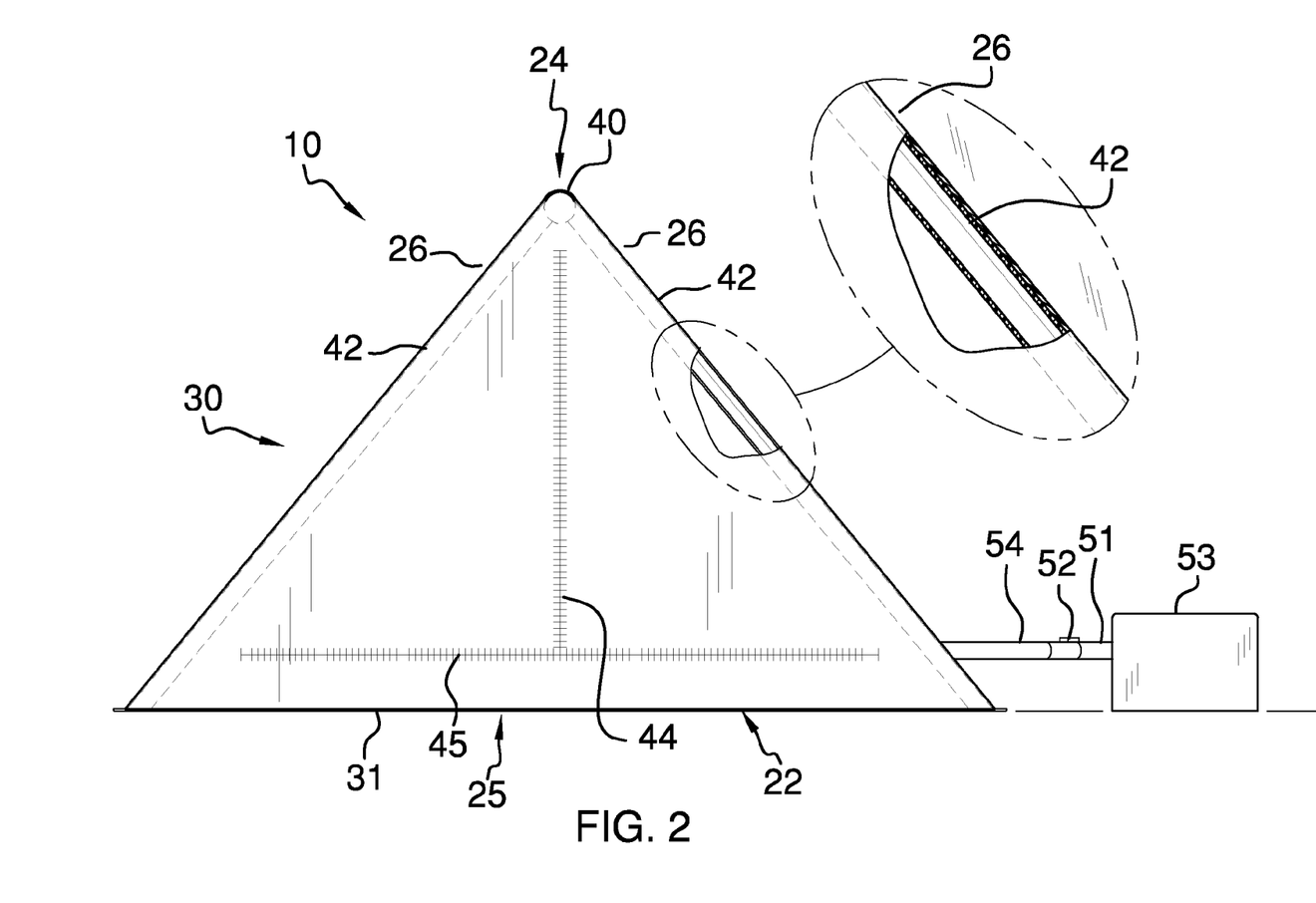
FIG. 2 is a first end view with partial cross section.

Referring to FIG. 2, the structure 30 further comprises the pair of identical spaced apart mirror image sides 26. The sides 26 are slanted outwardly and downwardly from the top 24 to the floor 31.

Figure 2A:
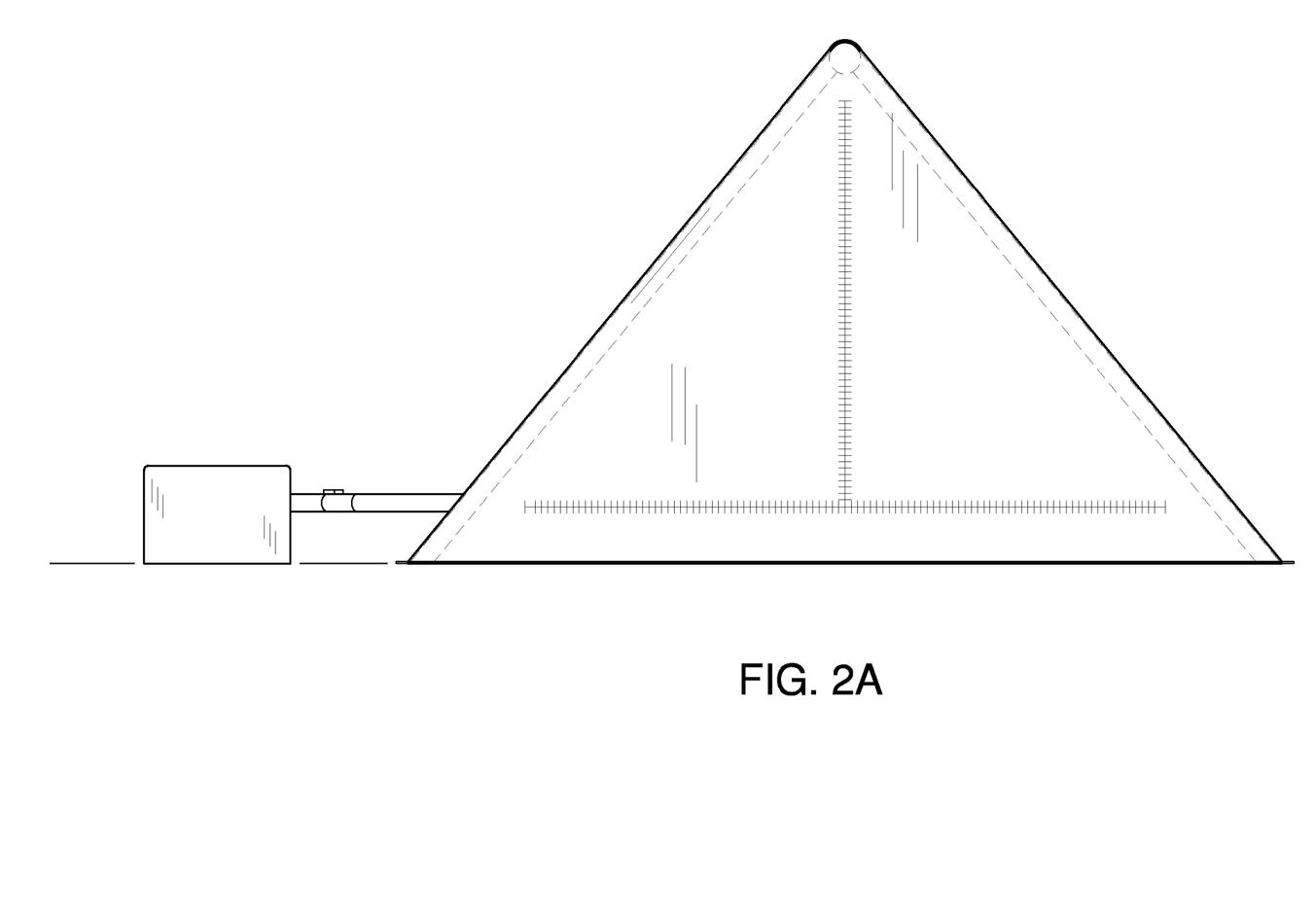
FIG. 2A is a second end view with vertical closure and arced closure.

Referring to FIG. 2A, the second end 23 is provided with an arced closure 45 and a vertical closure 44.

Referring to FIG. 4 and again to FIG. 1, a right circular half cone 27 is disposed at each end. Each right circular half cone 27 is connected to the sides 26, to the top 24, and to the floor 31. A seam 28 is disposed between each side 26 and each right circular half cone 27.

Figure 3:
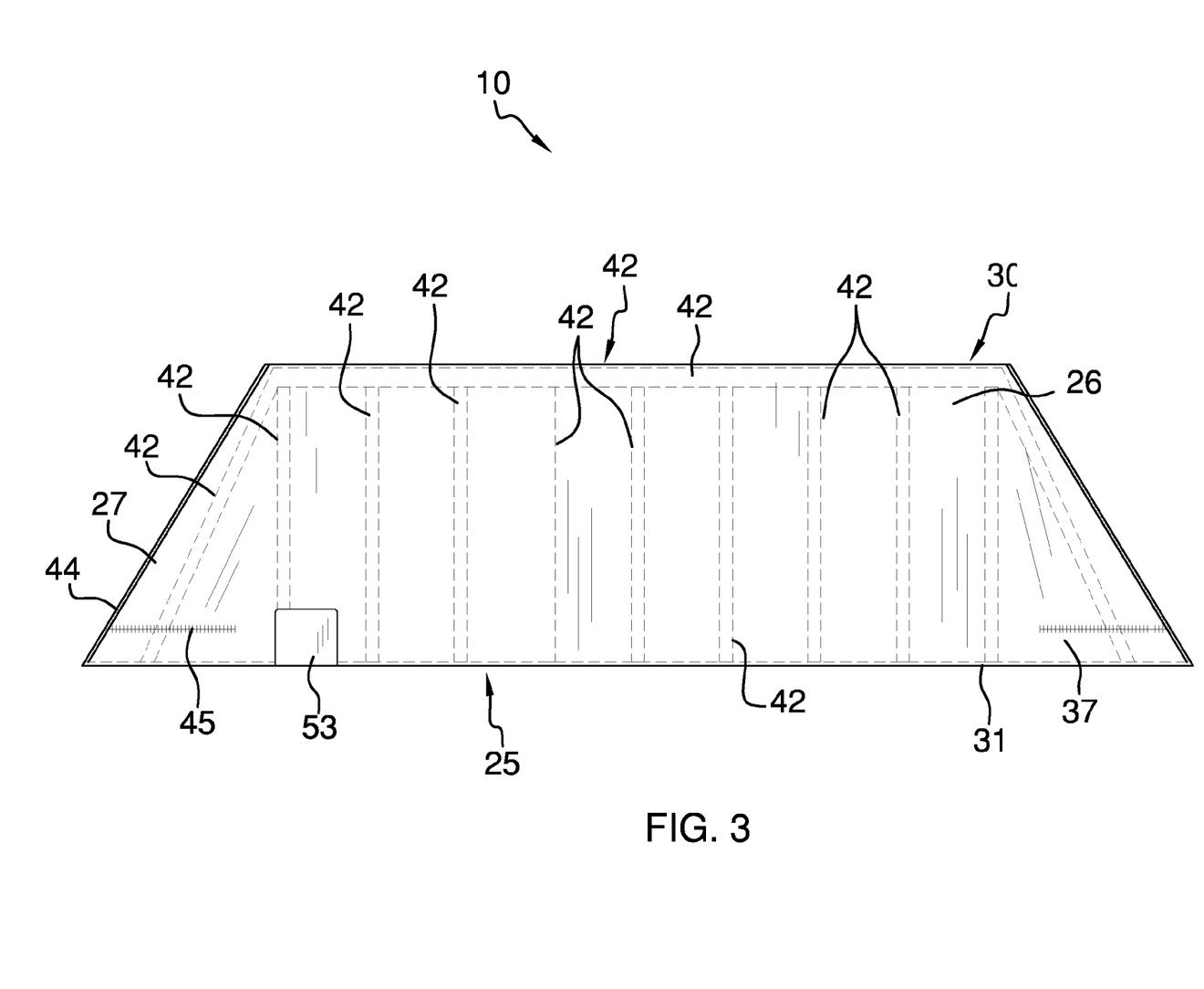
FIG. 3 is a lateral elevation view.
Figure 4:
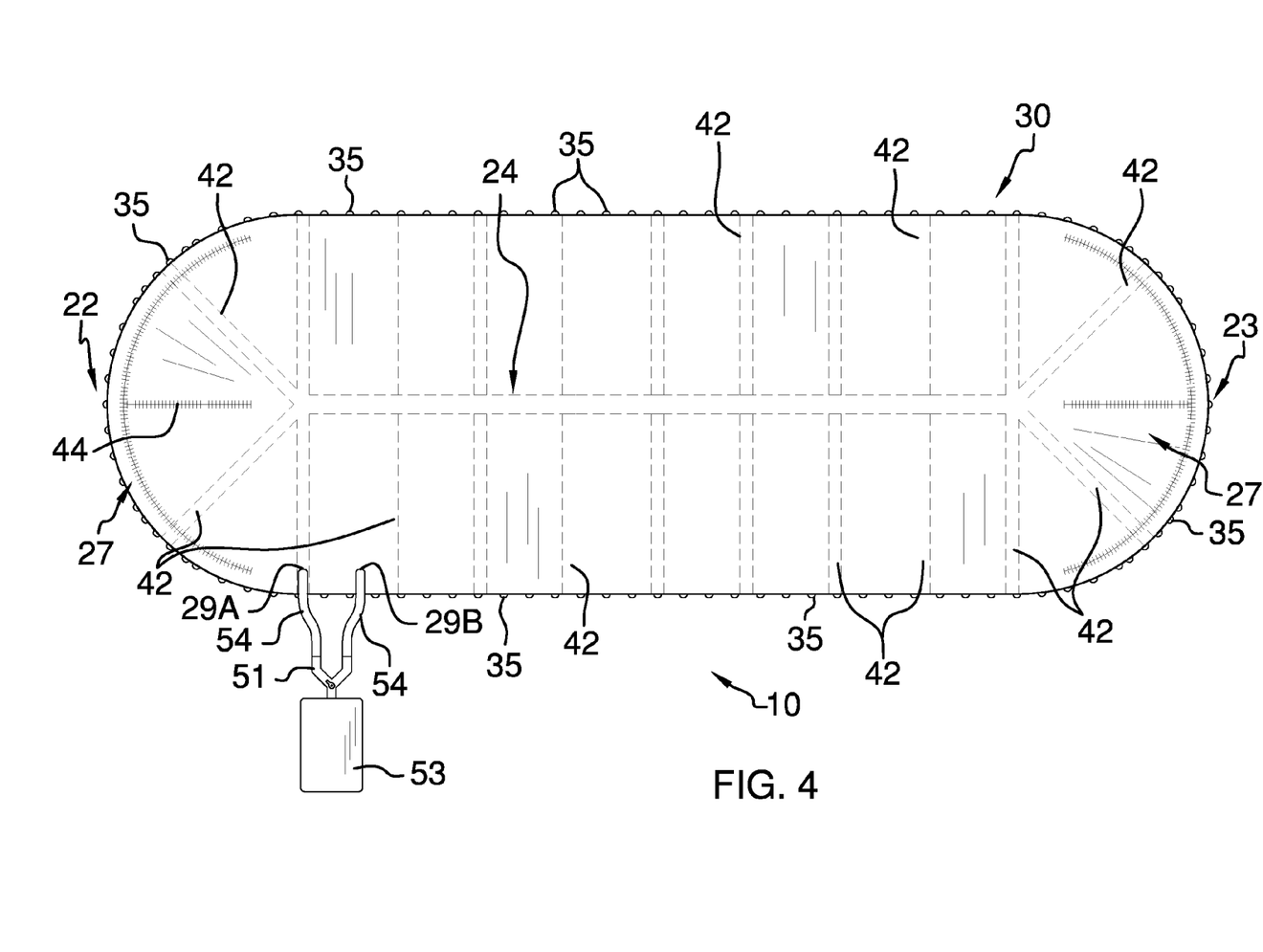
FIG. 4 is a top plan view.

Referring to FIG. 3 and again to FIG. 4, the inflatable spine 40 is disposed within the interior 21 top 24. The spine 40 is integral with the sides 26. The plurality of inflatable spaced apart straight supports 42 are disposed within the interior 21 from the top 24 to the floor 31.

The straight supports 42 are integral to the sides 26 and to the right circular half cones 27. The first end 22 right circular half cone 27 has two straight supports 42. The second end 23 right circular half cone 27 has three straight supports 42. The straight supports 42 are in communication with the spine 40.

Referring again to FIGS. 2 and 4, the pair of intersected closures disposed in the first end 22 right circular half cone 27 is provided. The closures comprise the vertical closure 44 disposed centrally within the right circular half cone 27 from proximal to the floor 31 to proximal to the top 24 and the arced closure 45 disposed downwardly within the right circular half cone 27. The arced closure 45 is disposed proximal to the floor 31 and to within proximity to each side 26.

Referring again to FIGS. 1 and 4, the pair of spaced apart ports are disposed within one side 26. The ports comprise the first port 29A connected to one of the straight supports 42 and the second port 29B connected to the structure 30 interior 21. The reversible air pump 53 provides a Y manifold with Y 51. The valve 52 is disposed within the Y manifold with Y 51. All, part, or none of the Y of the Y manifold is accessible to the air pump 53 by way of the valve 52. The pair of hoses 54 is provided. One hose 54 is removably connected to the first port 29A. One hose 54 is removably connected to the second port 29B.

Referring to FIG. 6 and also again to FIG. 2 the structure 30 and the spine 40 and straight supports 42 are selectively inflated. The existing auger 12 is inserted through the partially opened vertical closure 44. As the structure 30 is filled, the auger 12 is ideally progressively withdrawn and the closures may be closed.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the inflatable grain storage apparatus may be used.

What is claimed is:

1. An inflatable grain storage apparatus comprising, in combination:
   a selectively inflatable and deflatable structure having an exterior and an interior, a first end spaced apart from a second end, and a top spaced apart from a bottom;
   a floor disposed at the bottom;
   a plurality of spaced apart longitudinal straps disposed in the floor;
   a plurality of spaced apart cross straps disposed in the floor, the cross straps at a perpendicular to the longitudinal straps;
   a plurality of spaced apart d-rings disposed outwardly from the floor;
   a pair of identical spaced apart mirror image sides, the sides slanted outwardly and downwardly from the top to the floor;
   a right circular half cone disposed at each end, each right circular half cone connected to the sides, to the top, and to the floor;
   an inflatable spine disposed within the interior top, the spine integral with the sides;
   a plurality of inflatable spaced apart straight supports disposed within the interior from the top to the floor, the straight supports integral to the sides and to the right circular half cones, the first end right circular half cone having two straight supports, the second end right circular half cone having three straight supports, the straight supports in communication with the spine;
   a pair of intersected closures disposed in the first end right circular half cone, the closures comprising a vertical closure disposed centrally within the right circular half cone from proximal to the floor to proximal to the top, and an arced closure disposed downwardly within the right circular half cone the arced closure disposed proximal to the floor and to within proximity to each side;
   a pair of spaced apart ports disposed within one side, the ports comprising a first port connected to one of the straight supports and a second port connected to the structure interior;
   a positive pressure air pump;
   a Y manifold with Y connected to the air pump;
   a valve disposed within the Y manifold with Y, whereby all, part, or none of the Y is accessible to the air pump;
   a pair of hoses, one hose removably connected to the first port, one hose removably connected to the second port;
   whereby the structure, spine and straight supports and the structure interior are selectively inflatable.

2. The apparatus according to claim 1 wherein one of each of the plurality of spaced apart d-rings disposed outwardly from floor further comprises one d-ring extended from each strap.

3. The apparatus according to claim 2 wherein one of each of the plurality of spaced apart d-rings disposed outwardly from floor further comprises d-rings between the straps.

4. The apparatus according to claim 1 further comprising a seam disposed between each side and each right circular half cone.

5. The apparatus according to claim 2 further comprising a seam disposed between each side and each right circular half cone.

6. The apparatus according to claim 3 further comprising a seam disposed between each side and each right circular half cone.

7. An inflatable grain storage apparatus comprising, in combination:

a selectively inflatable and deflatable structure having an exterior and an interior, a first end spaced apart from a second end, and a top spaced apart from a bottom;

a floor disposed at the bottom;

a plurality of spaced apart longitudinal straps disposed in the floor;

a plurality of spaced apart cross straps disposed in the floor, the cross straps at a perpendicular to the longitudinal straps;

a plurality of spaced apart d-rings disposed outwardly from the floor;

a pair of identical spaced apart mirror image sides, the sides slanted outwardly and downwardly from the top to the floor;

a right circular half cone disposed at each end, each right circular half cone connected to the sides, to the top, and to the floor;

an inflatable spine disposed within the interior top, the spine integral with the sides;

a plurality of inflatable spaced apart straight supports disposed within the interior from the top to the floor, the straight supports integral to the sides and to the right circular half cones, the first end right circular half cone having two straight supports, the second end right circular half cone having two straight supports, the straight supports in communication with the spine;

a pair of intersected closures disposed in the first end and the second end right circular half cones, the closures comprising a vertical closure disposed centrally within the right circular half cone from proximal to the floor to proximal to the top, and an arced closure disposed downwardly within the right circular half cone the arced closure disposed proximal to the floor and to within proximity to each side;

a pair of spaced apart ports disposed within one side, the ports comprising a first port connected to one of the straight supports and a second port connected to the structure interior;

a reversible air pump;

a Y manifold with Y connected to the air pump;

a valve disposed within the Y manifold with Y and valve, whereby all, part, or none of the Y is accessible to the air pump;

a pair of hoses, one hose removably connected to the first port, one hose removably connected to the second port;

whereby the structure, spine and straight supports and the structure interior are selectively inflated and deflated via the Y manifold with Y and the valve connected to the reversible air pump.

8. The apparatus according to claim 7 wherein one of each of the plurality of spaced apart d-rings disposed outwardly from floor further comprises one d-ring extended from each strap.

9. The apparatus according to claim 8 wherein one of each of the plurality of spaced apart d-rings disposed outwardly from floor further comprises d-rings between the straps.

10. The apparatus according to claim 7 further comprising a seam disposed between each side and each right circular half cone.

11. The apparatus according to claim 8 further comprising a seam disposed between each side and each right circular half cone.

12. The apparatus according to claim 9 further comprising a seam disposed between each side and each right circular half cone.

\* \* \* \* \*